United States Patent [19]
Bohn

[11] Patent Number: 5,936,238
[45] Date of Patent: Aug. 10, 1999

[54] PORTABLE OPTICAL SCANNING DEVICE WITH A RECESSED OPTICAL WINDOW

[75] Inventor: David D. Bohn, Fort Collins, Colo.

[73] Assignee: Hewlett-Packard Company, Palo Alto, Calif.

[21] Appl. No.: 08/959,703

[22] Filed: Oct. 29, 1997

[51] Int. Cl.[6] .................................. H01J 3/14; G06K 7/10
[52] U.S. Cl. ...................... 250/234; 250/566; 250/208.1; 358/474
[58] Field of Search ..................................... 250/234–236, 250/208.1, 566, 568; 235/472; 358/474, 482, 494, 497

[56] References Cited

U.S. PATENT DOCUMENTS

| 5,272,353 | 12/1993 | Barkan et al. | 250/566 |
|---|---|---|---|
| 5,412,205 | 5/1995 | McVicar et al. | 235/472 |
| 5,739,923 | 4/1998 | Kawahara | 358/474 |

*Primary Examiner*—Stephone B. Allen
*Attorney, Agent, or Firm*—Cynthia S. Deal

[57] ABSTRACT

A hand-held scanning device is disclosed in which the scanning device housing window has a recessed optical portion of the window formed such that the recessed optical portion of the window does not come into contact with the object being scanned while a scan is being performed. This recessed optical portion of the window eliminates damage caused by contact with the object being scanned to the optical portion of the window. The recessed portion of the window is formed without corners in such a manner that it may easily be wiped clean by the end user without dirt, dust and the like building up in corners of the recess. The recessed portion of the window is also formed in such a manner as to maintain the object in a relatively flat position under the scan window throughout the scanning process.

27 Claims, 7 Drawing Sheets

PORTABLE OPTICAL SCANNING DEVICE WITH A RECESSED OPTICAL WINDOW

FIELD OF THE INVENTION

The present invention relates generally to optical scanners and, more particularly, to an optical scanner window assembly that does not contact the scanned object while a scan is being performed.

BACKGROUND OF THE INVENTION

Optical scanners are well-known in the art and produce machine-readable data which is representative of the image of an object, e.g. a page of printed text. Optical scanners generally employ line-focus systems which image an object by sequentially focusing narrow "scan line" portions of the object onto a linear photosensor array by sweeping a scanning head over the object.

In a line-focus system, a light beam from an illuminated line object is imaged by a lens on a linear photosensor array which is positioned remotely from the line object. The linear photosensor array is a single dimension array of photoelements which correspond to small area locations on the line object. These small area locations on the line object are commonly referred to as "picture elements" or "pixels." In response to light from its corresponding pixel location on the line object, each photosensor pixel element in the linear photosensor array (sometimes referred to simply as "pixels") produces a data signal which is representative of the light intensity that it experiences during an immediately preceding interval of time known as a sampling interval. All of the photoelement data signals are received and processed by an appropriate data processing system.

A hand-held optical scanning device is an optical scanner which is moved across a scanned object, e.g. a page of text, by hand. Optical systems for hand-held scanning devices must generally be very compact due to the relatively small size of hand-held scanning devices.

Rollers may be provided on a hand-held scanning device to guide the device across the object to be scanned and also to provide data to the scanning device microprocessor regarding the speed at which the scanning device is being moved over the scanned object. These rollers may also serve to control the speed at which an operator moves the scanning device across the scanned object.

The construction and operation of hand-held optical scanning devices employing such rollers is disclosed in the following U.S. Pat. Nos.: 5,381,020 of Kochis et al. for HAND-HELD OPTICAL SCANNER WITH ONBOARD BATTERY RECHARGING ASSEMBLY and 5,306,908 of McConica et al. for MANUALLY OPERATED HAND-HELD OPTICAL SCANNER WITH TACTILE SPEED CONTROL ASSEMBLY (and corresponding EPO patent application no. 94301507.3 filed Mar. 2, 1994), which are all hereby specifically incorporated by reference for all that is disclosed therein.

In most hand-held optical scanning devices, the optical components and electronics of the scanning device are enclosed in a housing which is adapted to be grasped by the hand of a user while a scan is being performed. The housing generally also rotatably mounts the roller or rollers previously described.

In such scanning devices, it is generally desirable to completely seal the portion of the housing enclosing the optical components and electronics. The housing, sealed in this manner, prevents dust, moisture and other potential contaminants from entering the interior of the housing and contaminating the optical components and associated scanning device electronics.

Because the image beam from the object must pass through the housing to reach the optical components, a sealed housing, as described above, must be provided with a transparent window. This window is often constructed of glass and mounted in the bottom wall of the scanning device housing. In many cases, however, the window is formed of a transparent plastic material in order to reduce the overall weight of the scanning device.

In conventional hand-held scanning devices, the window is located such that it rests directly on the object being scanned and actually slides along the object when the scanning device is moved across the object to perform a scanning operation. The window sliding along the object is useful in that the window maintains the object, typically a document in a flat, stable position as the optics is directed toward the object. However, this presents a problem since such sliding contact between the window and the object often results in scratching of the window material. Although plastic windows are more prone to such scratching, glass windows may also be scratched. Such scratching may result, for example when the scanning device is moved across objects which are dirty or gritty or when a staple is encountered.

A scratched or otherwise damaged window will distort the image beam passing through the window and thus result in degradation of the quality of the image acquired by the hand-held scanning device.

Thus, it would be generally desirable to provide an apparatus which overcomes these problems associated with hand-held optical scanning devices.

SUMMARY OF THE INVENTION

The present invention is directed to a hand-held scanning device in which the scanning device housing window is located such that it does not come into contact with the object being scanned while a scan is being performed. Specifically, a portion of the window is recessed, optically toward the scanning device photosensor array and away from the object being scanned.

This location of the window addresses the problems discussed above with respect to window damage caused by contact with the object being scanned. By moving the window out of contact with the object, it is much less likely to become scratched.

This recessed window configuration also includes a smooth transition from the planar window portion to the recessed portion of the window, which results in the window having no edges that could catch the document being scanned. The smooth transition between the planar window surface portion and the recessed portion of the window also permits the end user to clean the window without having dust, dirt and the like accumulating in corners of the recessed portion of the window, as there are not corners.

DETAILED DESCRIPTION OF THE INVENTION

Figure 1:
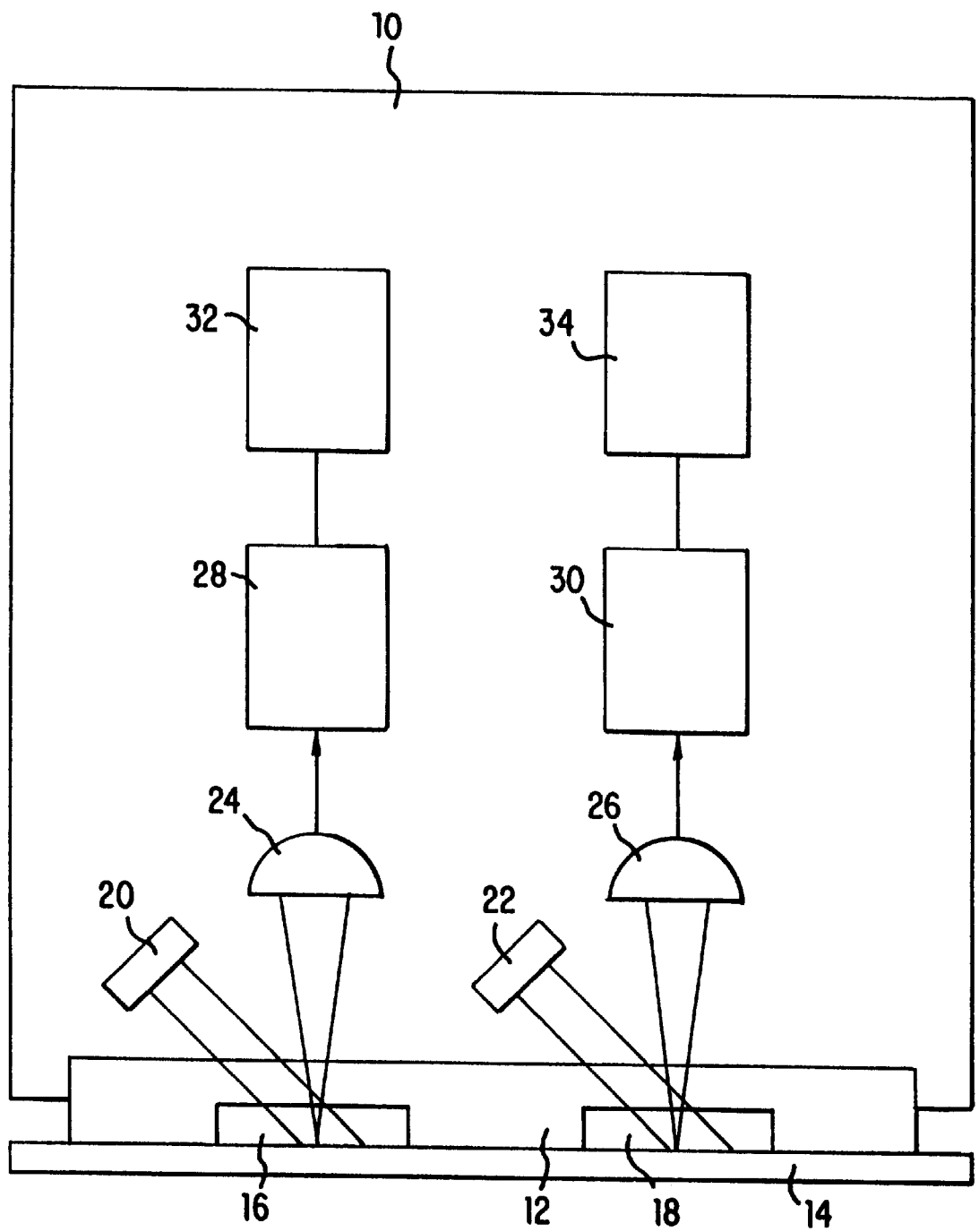
FIG. 1 illustrates a schematic side elevation view of an optical scanner having a window with optical recesses according to the present invention.

FIG. 1 illustrates a hand-held optical scanning device 10 according to the present invention for producing machine-readable data representative of a scanned object 14, typically a document. The optical scanning device 10 includes a photosensor assembly 28 for detecting an image of the object 14, optical components 24 arranged along a light path extending between an object 14 which is to be imaged and the photosensor assembly 28, a light emitting device 20, and a window assembly 12. The window assembly 12 according to the present invention includes a recessed portion 16 located within the light path of the object 14 to be imaged. The image detecting system of the optical scanning device 10 may also include imaging photoelectric circuitry 32.

The optical scanning device 10 may also include a navigational detection system, which may include a photosensor assembly 30 for producing a navigational image from the object 14, optical components 26 arranged along a light path extending between an object 14 and the photosensor assembly 30, a light emitting device 22, and a window assembly 12. The window assembly 12 according to the present invention may include a recessed portion 18 located within the navigational light path. The navigational detection system of the optical scanning device 10 may also include photoelectric navigational circuitry 34.

The window 12 of the present invention permits the window to flatten the object being scanned (typically a paper document or the like) without the optical surfaces of the window 12 in the light path of the image detecting system or the optical surfaces of the window 12 in the light path of the navigational detecting system being scratched by the document, dust or dirt particles on the document, staples on the document, etc.

Only recessed portion 16 of the window 12 will be discussed with reference to FIGS. 2–5, but it will be understood that all of the concepts discussed with respect to recessed portion 16 may also apply to recessed portion 18 and the navigational optics.

Figure 2:
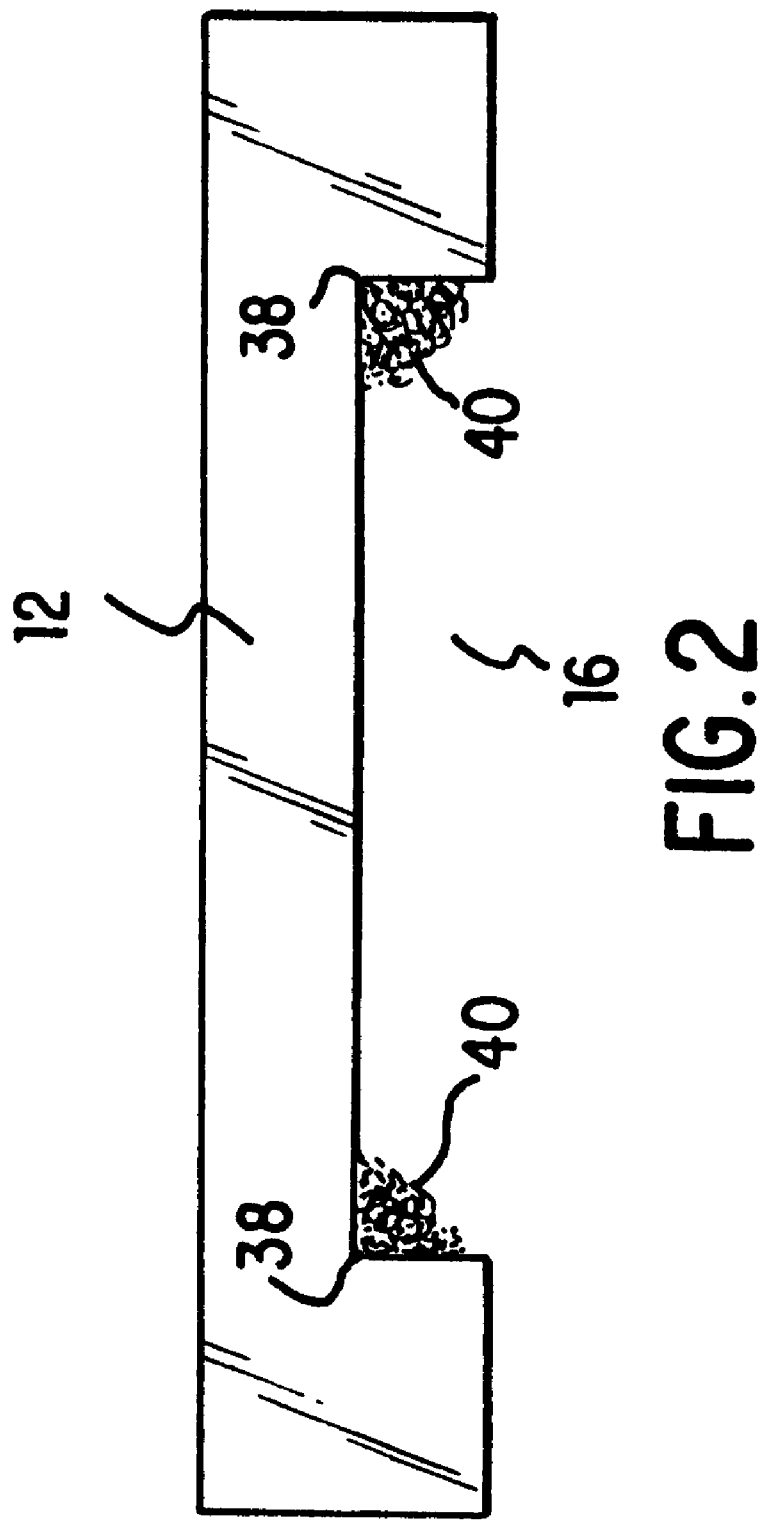
FIG. 2 illustrates a portion of a window according to a first embodiment of the present invention.

FIG. 2 illustrates one potential problem associated with the present invention if the recessed portion 16 of the window 12 has relatively square inside corners 38. The problem being that dirt and dust particles 40 may accumulate in the inside corners 38 of the recessed portion 16 of the window 12. The size of the recessed portion 16 of the window 12 may also prevent the end user from being able to adequately wipe the inside corners 38 clean of the dust and dirt particles 40.

Figure 3:
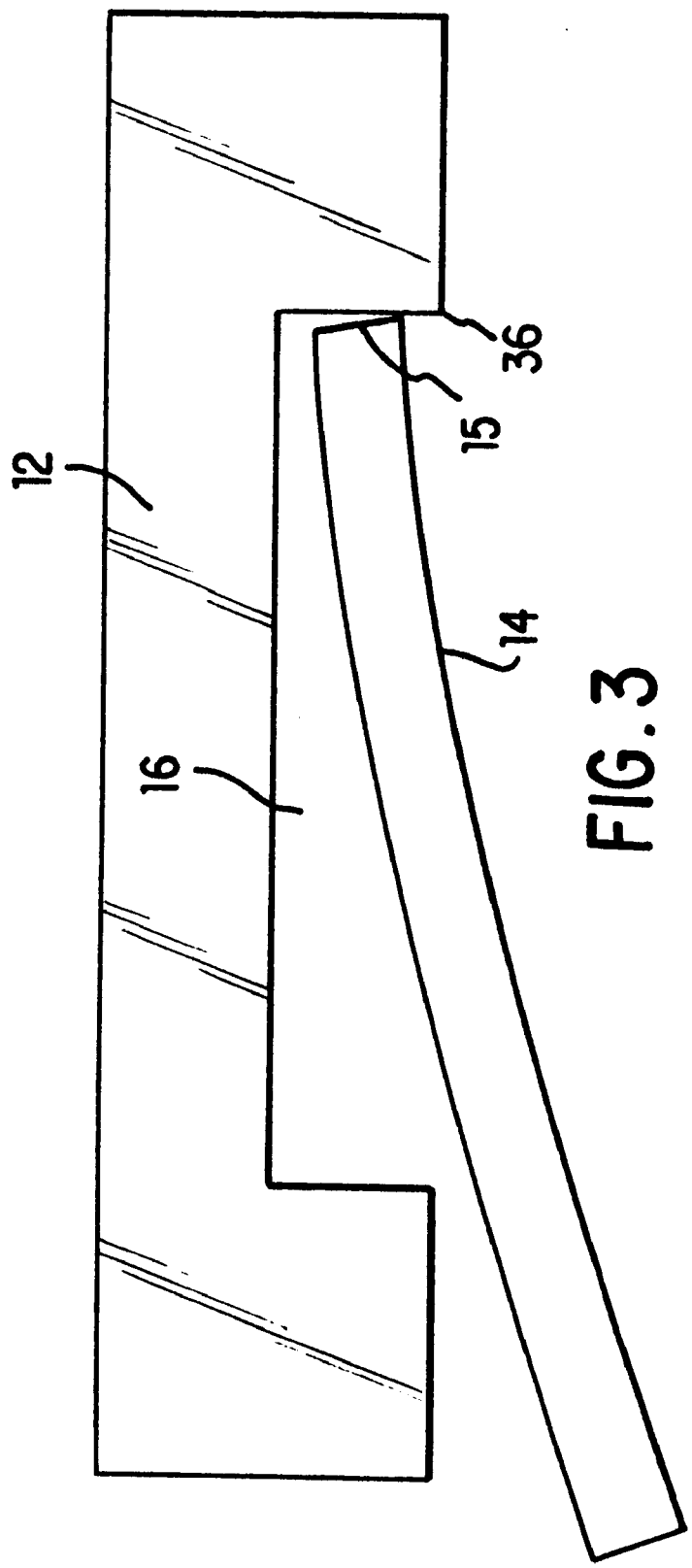
FIG. 3 illustrates a portion of a window according to a first embodiment of the present invention.

FIG. 3 illustrates another potential problem associated with the present invention if the recessed portion 16 of the window 12 has relatively square outside corners 36. The problem being that the corners and end 15 of the document 14 being scanned may be caught by the corner edge 36 of the recessed portion 16 of the window 12. The corner edge 36 may also catch on staples, paper clips and the like that may be attached to the document 14 being scanned.

Figure 4:
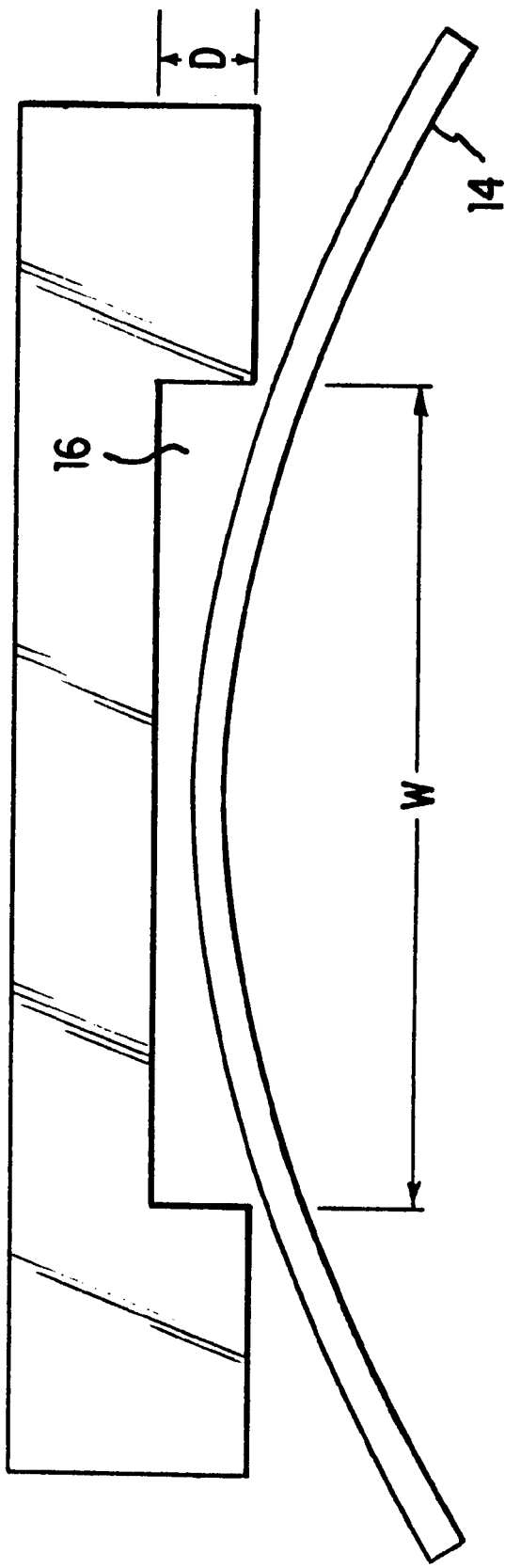
FIG. 4 illustrates a portion of a window according to a first embodiment of the present invention.

FIG. 4 illustrates another potential problem associated with the present invention if the recessed portion 16 of the window 12 is made too wide (W) or too deep (D). The problem being that the window 12 is needed to hold the document 14 in a relatively flat position under the imaging and navigational optical components during the scanning process. However, if the recessed portion 16 in the window is made too wide (W) and too deep (D), then the document may bow into the recessed portion 16 of the window 12. This may cause several problems. First, if the bowing of the document 14 is severe enough, the recessed portion 16 of the window 12 may be scratched. Second, the bowing of the document 14 may cause the imaging optics and the navigational optics to be out of focus.

Figure 5:
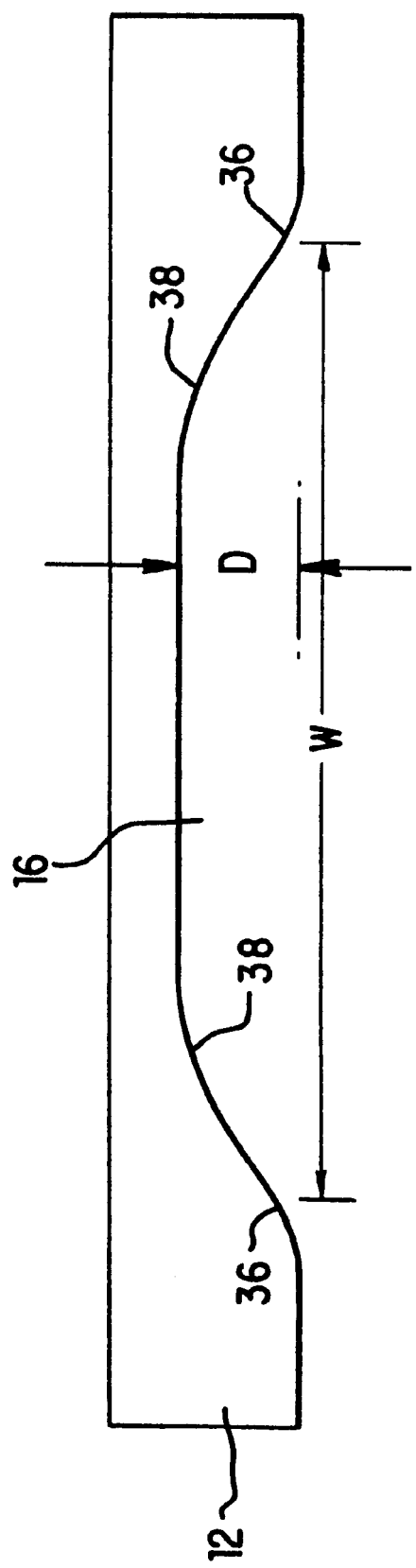
FIG. 5 illustrates a portion of a window according to a second embodiment of the present invention.

FIG. 5 illustrates the embodiment best anticipated to overcome the potential deficiencies of the present invention as described in FIGS. 2–4. Specifically, FIG. 5 illustrates the window 12 with a recess 16 having inner and outer corners 38 and 36 of sufficiently smooth radii to avoid the accumulation of dust in the inner corners 38 as shown in FIG. 2 and the catching of the document edges on the outer corners 36 as shown in FIG. 3.

Also, the width (W) of the recess 16 is approximately 1–4 mm for the length of the scan line, which is wide enough to permit a line of data to be scanned, but sufficiently narrow to prevent the document from bowing up into the recess as shown in FIG. 4. The relatively narrow width (W) of the recess 16 permits the window 12 to flatten the document being scanned without the optical surfaces inside the recess 16 being scratched and without the document 14 bowing into the recess 16 in the window 12.

The depth (D) of the recessed portion is approximately 0.02–0.5 mm. The combination of the shallow depth, narrow width and smooth radii at the corners of the recessed portion 16 of the window, permit the window 12 to flatten the document without the document bowing into the recessed portion 16 of the window, without the optical surface of the recessed portion 16 of the window 12 being scratched. The shape, width and depth of the recessed portion 16 of the window 12 also helps to prevent dust particles from accumulating in the recessed portion 16 of the window 12 and allows the recessed portion 16 of the window to be easily cleaned by the end user.

The window 12 with recessed portions 16 and 18 may be made of polycarbonate, plastic, acrylic, polystyrene, cyclic olefin copolymer (COC), or the like by means of injection molding to form the recessed portions 16 and 18. Although plastic materials are preferred because plastic is light and durable if the hand-held scanner 10 is dropped, tossed in a briefcase, etc, window 12 may also be made of glass by means of machining and polishing or molding to make the recesses 16 and 18. The recesses 16 and 18 may also be made from two separate pieces that are machined, polished and glued together.

Also, both sides of the window 12 and recesses 16 and 18 are coated with any common anti-reflection coating, such as Magnesioum Flouride or Invisiglass from OCLI at 2739 Northpoint Parkway, Santa Rosa, Calif. 95407. Also, the surface of window 12 in contact with the document 14 is coated with an anti-scratch coating, such as PHC587 Weatherable Abrasian Resistance Primerless Silicone Hard Coat from General Electric Company at 250 Hudson River Road, Waterford, N.Y. 12188.

As described above, the optical window 12 with the relatively narrow optical image scan line recess 16 and the optical navigation scan area recess 18 permits the window 12 to flatten the document during the scanning process without scratching the recessed optical portions 16 and 18 of the window 12; the relatively narrow and shallow recesses 16 and 18, the relatively smooth radii at the corners of the recesses 16 and 18 allows for relatively easy access for cleaning the recessed optical portions 16 and 18 of the window 12; the relatively smooth radii on the corners of the recesses 16 and 18 allow for scanning without catching the edges 15 of documents on the outside, corner edges 36 of the recesses 16 and 18; and the relatively smooth inside corners 38 of the recesses 16 and 18 help to prevent dust from accumulating in the recesses 16 and 18. Window 12 may by plastic or glass.

Figure 6:
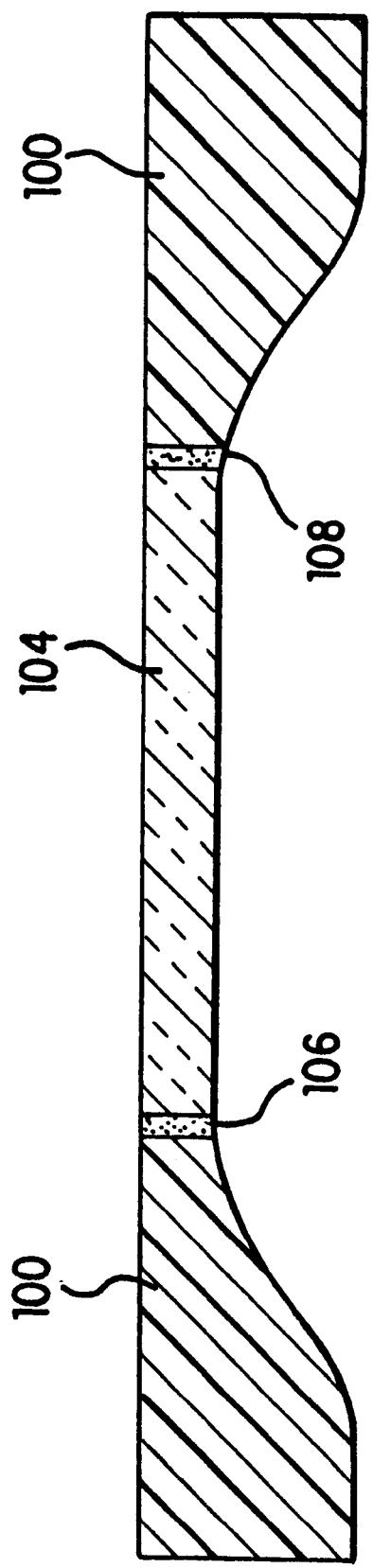
FIG. 6 illustrates a portion of a window according to a third embodiment of the present invention.

FIG. 6 illustrates a window according to a third embodiment of the present invention that may comprise a plastic frame 100 that surrounds a glass optical window 104. The glass optical window 104 is held in the plastic window frame 100 by means of an adhesive joint, glue or epoxy, such as UV curable acrylic. One known UV curable acrylic being Dymax 191M. The overall size and shape of glass optic window 104 in plastic window frame 100 are substantially the same as the overall size and shape of window assembly 12.

Figure 7:
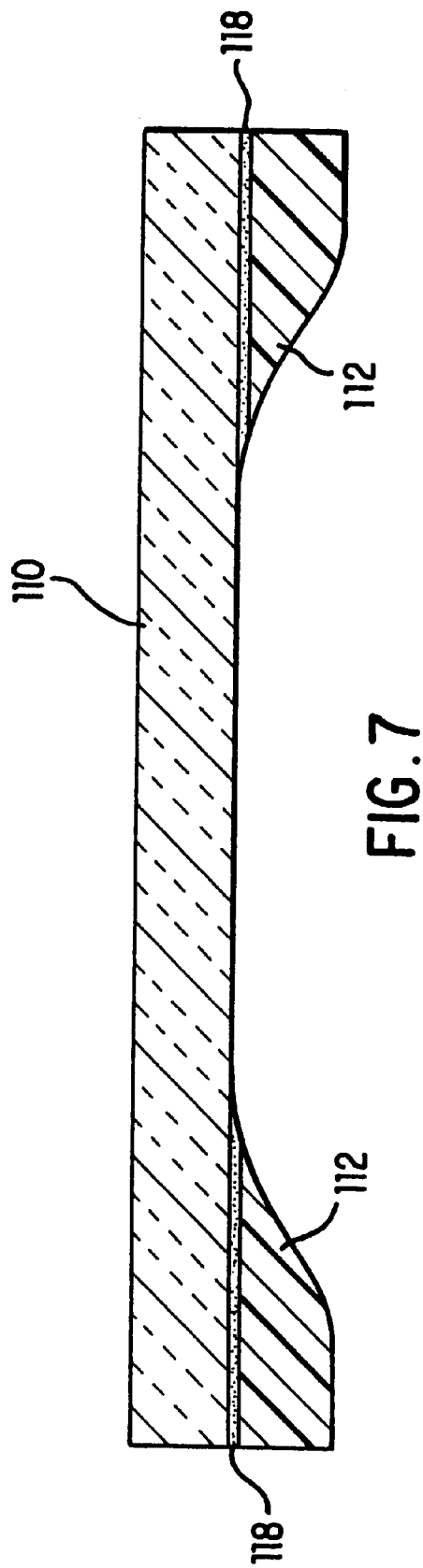
FIG. 7 illustrates a portion of a window according to a fourth embodiment of the present invention.

FIG. 7 illustrates a window according to a fourth embodiment of the present invention that may comprise a substantially planar glass window 110 with a plastic window frame 112 that is attached to window 110 by means of an adhesive joint, glue or epoxy, such as UV curable acrylic. The overall size and shape of the glass window 110 and the plastic window frame 112 assembly is substantially the same as the overall size and shape of window assembly 12.

Embodiments three and four describe in FIGS. 6 and 7 are good embodiments because they both allow a plastic frame 100 or 112 to come into contact with the document being scanned, absorbing a great deal of the shock, downward force and impact that the hand held scanner may be subjected to by an end user. These embodiments also have the added advantage of having the actual optical window being made of glass, which is much harder to scratch than plastic, but the glass does not have to be machined or polished to form the recessed portion of the window. But rather, plastic is molded to create a frame 100 or 112 that is attached to the glass optical windows 104 or 110 to create a recessed optical window in both embodiments.

The foregoing description of the present invention has been presented for purposes of illustration and description. It is not intended to be exhaustive or to limit the invention to the precise form disclosed, and other modifications and variations may be possible in light of the above teachings. For example, recessed optical image scan line may be on a flat bed scanner or a sheet feed scanner rather than in a hand-held scanner as described above. Also, a scanner may employ only one of either the recessed optical image scan line portion 16 of the window 12 or the recessed optical navigation scan area portion 18 of the window 12 without departing from the spirit of the present invention.

The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A photoelectric imaging apparatus for producing machine-readable data representative of imaged objects comprising:
   (a) a photosensor assembly;
   (b) optical components arranged along a light path extending between an object which is to be imaged and said photosensor assembly;
   (c) a light supplying mechanism positioned in illuminating relationship with said object;
   (d) a window assembly comprising:
      (i) a recessed window portion located within said light path between said optical components and said object;
      (ii) a contact window portion for making contact with said object while said object is being imaged.

2. The apparatus of claim 1 wherein said recessed window portion is configured to maintain a non-contact relationship with said object while said object is being imaged.

3. The apparatus of claim 1 wherein said recessed portion of said window assembly is approximately 1–4 mm in width for the length of the scan line.

4. The apparatus of claim 1 wherein said recessed window portion of said window assembly is approximately 0.02–0.5 mm deep for the length of said scan line.

5. The apparatus of claim 1 wherein said window assembly comprises plastic.

6. The apparatus of claim 5 wherein said window assembly is made by an injection molding process.

7. The apparatus according to claim 1 wherein said window assembly comprises glass.

8. The apparatus according to claim 7 wherein said window assembly is made by means of machining.

9. The apparatus according to claim 1 wherein said recessed portion of said window assembly is glass and said contact portion of said window is plastic.

10. The apparatus of claim 1 wherein said recessed window portion and said contact window portion are integrally formed.

11. A photoelectric imaging apparatus for producing machine-readable data representative of imaged objects comprising:
   (a) a photosensor assembly;
   (b) optical components arranged along a light path extending between an object which is to be imaged and said photosensor assembly;
   (c) a light supplying mechanism positioned in illuminating relationship with said object;
   (d) a window assembly comprising:
      (i) a recessed optical image scan line window portion located within said light path between said optical components and said object;
      (ii) a recessed optical navigational scan area window portion; and
      (iii) a contact window portion for making contact with said object while said object is being imaged.

12. The apparatus of claim 11 wherein said recessed optical image scan line window portion and said recessed optical navigation scan area window portion of said window assembly are configured to maintain a non-contact relationship with said object while said object is being imaged.

13. The apparatus of claim 11 wherein said recessed optical image scan line window portion and said recessed optical navigation scan area window portion of said window assembly are approximately 1–4 mm in width for the length of the scan line.

14. The apparatus of claim 11 wherein said recessed optical image scan line window portion and said recessed optical navigation scan area window portion of said window assembly are approximately 0.02–0.5 mm deep for the length of said scan line.

15. The apparatus of claim 11 wherein said window assembly comprises plastic.

16. The apparatus of claim 15 wherein said window assembly is made by an injection molding process.

17. The apparatus according to claim 11 wherein said window assembly comprises glass.

18. The apparatus according to claim 17 wherein said window assembly is made by means of machining.

19. The apparatus according to claim 11 wherein said recessed portion of said window assembly is glass and said contact portion of said window is plastic.

20. The apparatus of claim 11 wherein said recessed optical image scan line window portion and said recessed optical navigation scan area window portion of said window assembly and said contact window portion are integrally formed.

21. A method of manufacturing an optical window for use in a photoelectric imaging apparatus for producing machine-readable data representative of a scanned object, said method comprising the following steps:
  (a) forming a contact window portion of said optical window, said contact window portion operatively formed for coming into contact with said document during a scan and maintaining said object in a relatively flat manner during a scan; and
  (b) forming a noncontact, recessed optical window portion in said optical window, said noncontact, recessed optical window portion operatively formed such that said noncontact, recessed optical window portion will not come into contact with said object during a scan, wherein there is a relatively smooth radii of transition between said contact window portion and said noncontact, recessed optical window portion.

22. The method according to claim 21, wherein said contact window portion and said noncontact, recessed optical window portion are formed of plastic.

23. The method according to claim 21, wherein said contact window portion and said noncontact, recessed optical window portion are formed by injection molding.

24. The apparatus according to claim 21 wherein said window assembly comprises glass.

25. The apparatus according to claim 24 wherein said window assembly is made by means of machining.

26. The apparatus according to claim 21 wherein said recessed portion of said window assembly is glass and said contact portion of said window is plastic.

27. A method of manufacturing a photoelectric imaging apparatus for producing machine-readable data representative of imaged objects, said method comprising the following steps:
  (a) providing a photosensor assembly;
  (b) providing optical components arranged along a light path extending between an object which is to be imaged and said photosensor assembly;
  (c) providing a light supplying mechanism positioned in illuminating relationship with said object; and
  (d) providing a window assembly comprising a contact window portion of said optical window and a noncontact, recessed optical window portion in said optical window, said contact window portion operatively formed for coming into contact with said document during a scan and maintaining said object in a relatively flat manner during a scan, said noncontact, recessed optical window portion operatively formed such that said noncontact, recessed optical window portion will not come into contact with said object during a scan, wherein there is a relatively smooth radii of transition between said contact window portion and said noncontact, recessed optical window portion.

* * * * *